(12) United States Patent
Tidwell et al.

(10) Patent No.: US 9,100,422 B1
(45) Date of Patent: Aug. 4, 2015

(54) NETWORK ZONE IDENTIFICATION IN A NETWORK SECURITY SYSTEM

(75) Inventors: Kenny Tidwell, Los Altos, CA (US); Christian Beedgen, San Jose, CA (US)

(73) Assignee: Hewlett-Packard Development Company, L.P., Houston, TN (US)

( * ) Notice: Subject to any disclaimer, the term of this patent is extended or adjusted under 35 U.S.C. 154(b) by 2059 days.

(21) Appl. No.: 10/974,105

(22) Filed: Oct. 27, 2004

(51) Int. Cl.
*H04L 29/06* (2006.01)

(52) U.S. Cl.
CPC .................................. *H04L 63/1408* (2013.01)

(58) Field of Classification Search
CPC .................................................. H04L 63/1408
USPC ........................................................ 726/23
See application file for complete search history.

(56) References Cited

U.S. PATENT DOCUMENTS

| | | |
|---|---|---|
| 5,557,742 A | 9/1996 | Smaha et al. |
| 5,717,919 A | 2/1998 | Kodavalla et al. |
| 5,850,516 A | 12/1998 | Schneier |
| 5,956,404 A | 9/1999 | Schneier et al. |
| 5,978,475 A | 11/1999 | Schneier et al. |
| 6,070,244 A | 5/2000 | Orchier et al. |
| 6,134,664 A | 10/2000 | Walker |
| 6,192,034 B1 | 2/2001 | Hsieh et al. |
| 6,275,942 B1 | 8/2001 | Bernhard et al. |
| 6,321,338 B1 | 11/2001 | Porras et al. |
| 6,408,391 B1 | 6/2002 | Huff et al. |
| 6,408,404 B1 | 6/2002 | Ladwig |
| 6,484,203 B1 | 11/2002 | Porras et al. |
| 6,542,075 B2 | 4/2003 | Barker et al. |
| 6,694,362 B1 | 2/2004 | Secor et al. |
| 6,704,874 B1 | 3/2004 | Porras et al. |
| 6,708,212 B2 | 3/2004 | Porras et al. |
| 6,711,615 B2 | 3/2004 | Porras et al. |
| 6,839,850 B1 | 1/2005 | Campbell et al. |
| 6,928,556 B2 | 8/2005 | Black et al. |
| 6,966,015 B2 | 11/2005 | Steinberg et al. |
| 6,981,146 B1 * | 12/2005 | Sheymov ...................... 713/172 |
| 6,985,920 B2 | 1/2006 | Bhattacharya et al. |
| 6,988,208 B2 | 1/2006 | Hrabik et al. |

(Continued)

FOREIGN PATENT DOCUMENTS

| | | |
|---|---|---|
| WO | WO 02/45315 A2 | 6/2002 |
| WO | WO 02/060117 A1 | 8/2002 |

(Continued)

OTHER PUBLICATIONS

Labib, Khaled, and Rao Vemuri. "NSOM: A real-time network-based intrusion detection system using self-organizing maps." Networks and Security (2002): 1-6.*

(Continued)

*Primary Examiner* — Harris Wang
(74) *Attorney, Agent, or Firm* — Hewlett-Packard Patent Department

(57) ABSTRACT

Different network segments can have overlapping address spaces. In one embodiment, the present invention includes a distributed agent of a security system receiving a security event from a network device monitored by the agent. In one embodiment, the agent normalizes the security event into an event schema including one or more zone fields. In one embodiment, the agent also determines one or more zones associated with the received security event, the one or more zones each describing a part of a network, and populates the one or more zone fields using the determined one or more zones.

22 Claims, 4 Drawing Sheets

(56) References Cited

U.S. PATENT DOCUMENTS

| | | | |
|---|---|---|---|
| 7,039,953 B2 | 5/2006 | Black et al. | |
| 7,043,727 B2 | 5/2006 | Bennett et al. | |
| 7,089,428 B2* | 8/2006 | Farley et al. | 726/22 |
| 7,127,743 B1 | 10/2006 | Khanolkar et al. | |
| 7,159,237 B2 | 1/2007 | Schneier et al. | |
| 7,171,689 B2 | 1/2007 | Beavers | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al. | |
| 7,333,999 B1 | 2/2008 | Njemanze | |
| 7,376,969 B1 | 5/2008 | Njemanze et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0053033 A1* | 5/2002 | Cooper et al. | 713/201 |
| 2002/0069356 A1* | 6/2002 | Kim | 713/160 |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0162026 A1* | 10/2002 | Neuman et al. | 713/201 |
| 2002/0184532 A1 | 12/2002 | Hackenberger et al. | |
| 2003/0004688 A1* | 1/2003 | Gupta et al. | 702/188 |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0097590 A1* | 5/2003 | Syvanne | 713/201 |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1* | 3/2004 | Connary et al. | 713/201 |
| 2004/0088571 A1* | 5/2004 | Jerrim et al. | 713/201 |
| 2004/0221191 A1 | 11/2004 | Porras et al. | |
| 2004/0255167 A1* | 12/2004 | Knight | 713/201 |
| 2004/0260763 A1* | 12/2004 | Bhattacharya et al. | 709/202 |
| 2004/0260945 A1* | 12/2004 | Raikar et al. | 713/201 |
| 2005/0027845 A1 | 2/2005 | Secor et al. | |
| 2005/0060562 A1* | 3/2005 | Bhattacharya et al. | 713/200 |
| 2005/0204404 A1 | 9/2005 | Hrabik et al. | |
| 2005/0251860 A1* | 11/2005 | Saurabh et al. | 726/23 |
| 2006/0069956 A1 | 3/2006 | Steinberg et al. | |
| 2006/0095587 A1 | 5/2006 | Bhattacharya et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2010/0058165 A1 | 3/2010 | Bhattacharya et al. | |

FOREIGN PATENT DOCUMENTS

| | | |
|---|---|---|
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Enterprise Coverage: Technology Architecture," date unknown, [online] Retrieved from the Internet <URL: http://www.snaiso.com/Documentation/Arcsight/arcsight_archdta.pdf>.

ArcSight, "Managed Process: ArcSight Reporting System," date unknown, [online] Retrieved from the Internet <URL: http://www.snaiso.com/Documentation/Arcsight/arcsight_reportsys.pdf>.

ArcSight, "Managed Process: Console-Based Management," date unknown, [online] Retrieved from the Internet <URL: http://www.snaiso.com/Documentation/Arcsight/arcsight_console.pdf >.

ArcSight, "Precision Intelligence: SmartRules™ and Cross-Correlation," date unknown, [online] Retrieved from the Internet <URL: http://www.snaiso.com/Documentation/Arcsight/arcsight_correlation.pdf>.

ArcSight, "Precision Intelligence: SmartAgent™," date unknown, [online] Retrieved from the Internet <URL: http://www.ossmanagement.com/SmartAgent.pdf>.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved on Nov. 15, 2002] Retrieved from the Internet <URL: http:www.arcsight.com/product_info05.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Enterprise," 2002, [online] [Retrieved on Oct. 25, 2002] Retrieved from the Internet <URL: http:www.arcsight.com/>.

ArcSight, "Technical Brief: How Correlation Eliminates False Positives," date unknown, source unknown.

(56) References Cited

OTHER PUBLICATIONS

Burleson, D., "Taking Advantage of Object Partitioning in Oracle8i," Nov. 8, 2000; [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_rmalization.pdf>.

Cheung, S. et al., "EMERALD Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20$^{th}$ NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

U.S. Appl. No. 60/405,921, filed Aug. 26, 2002, Gisby et al.
U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

NETWORK ZONE IDENTIFICATION IN A NETWORK SECURITY SYSTEM

FIELD OF THE INVENTION

The present invention relates to a computer-based system for capturing security events from heterogeneous and homogenous sources, and specifically to correlating a number of security events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

Different network segments can have overlapping address spaces. In one embodiment, the present invention includes a distributed agent of a security system receiving a security event from a network device monitored by the agent. In one embodiment, the agent normalizes the security event into an event schema including one or more zone fields. In one embodiment, the agent also determines one or more zones associated with the received security event, the one or more zones each describing a part of a network, and populates the one or more zone fields using the determined one or more zones.

BRIEF DESCRIPTION OF THE DRAWINGS

The present invention is illustrated by way of example, and not limitation, in the figures of the accompanying drawings in which.

DETAILED DESCRIPTION

Figure 1:
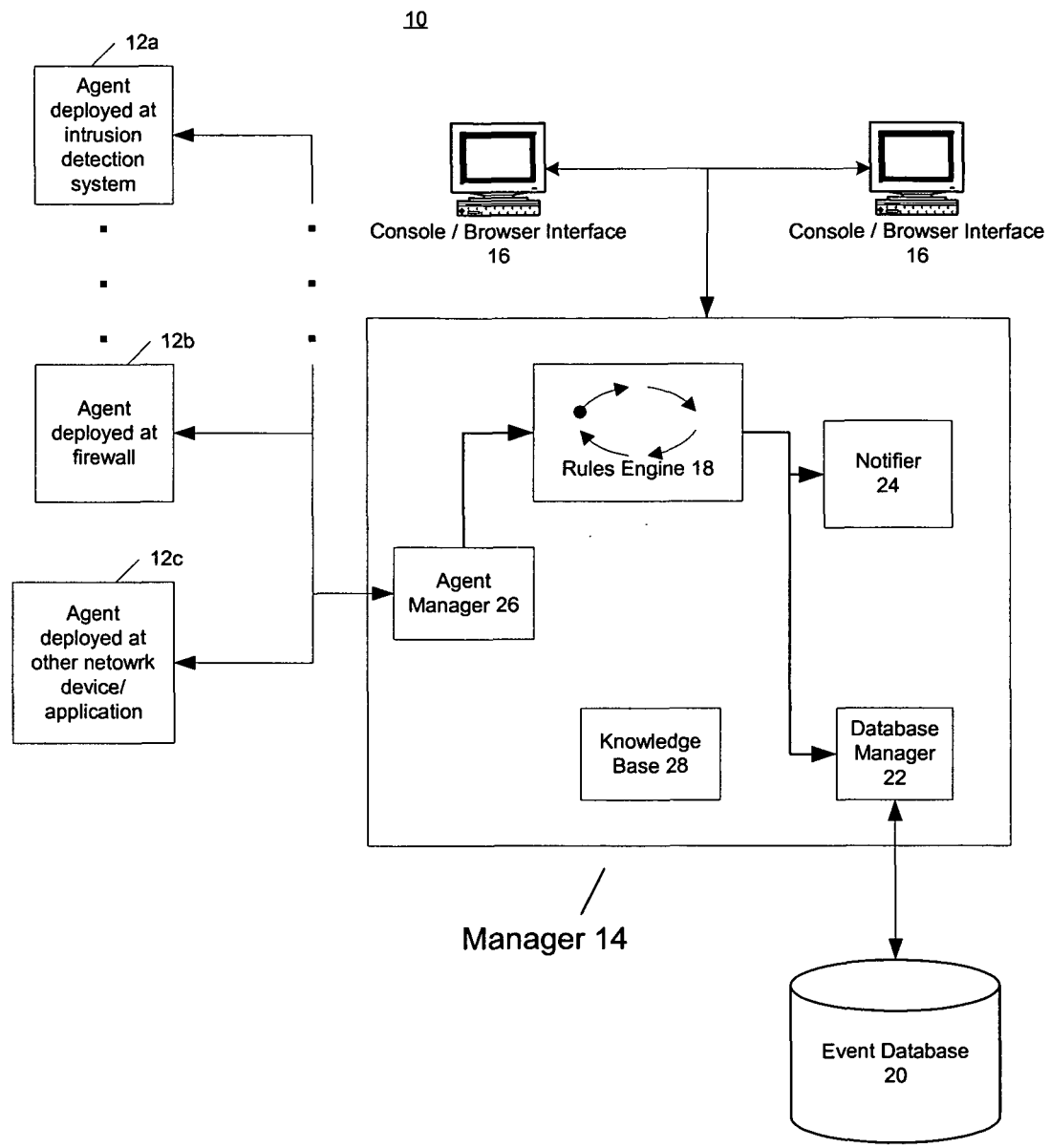
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer-(e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Network Security Devices", filed Dec. 2, 2002, which is hereby incorporated fully by reference.

The agents 12 described above are configured, in one embodiment, to perform various pre-correlation processing on the security events they observe at their respective monitor devices. An agent 12, for example, can normalize observed events (i.e., map events to some universal schema used by the network security system 10), aggregate events to save memory and bandwidth, and batch events for efficient transmission. Such agent 12 functionalities, and others, are described in further detail in U.S. application Ser. No. 10/308, 584, entitled "Method for Aggregating Events to be Reported by software agent", filed Dec. 2, 2002, which is hereby incorporated fully by reference.

Figure 2:
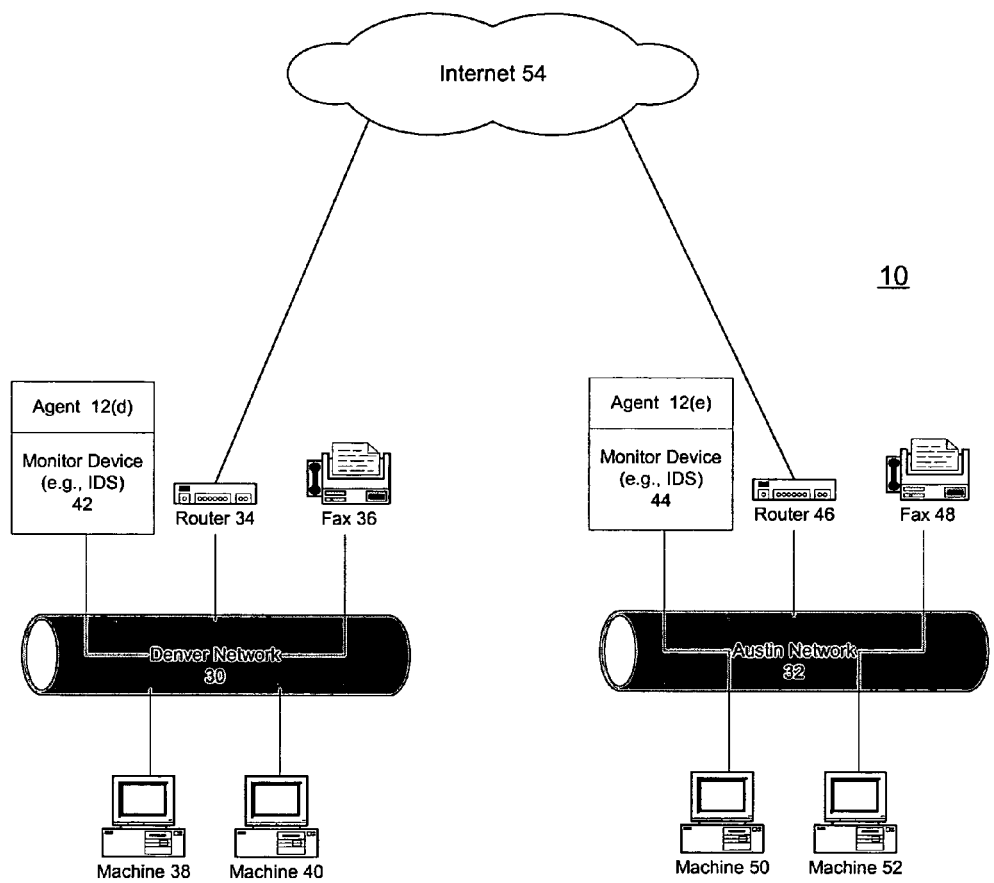
FIG. 2 is a block diagram a distributed network security system according to one embodiment of the present invention.

Another configuration of the network security system 10 is illustrated by a simplified diagram in FIG. 2. FIG. 2 shows a configuration in which agents 12 are distributed at multiple remote sites that are connected to the Internet 54. Agent 12(d) collects events from monitor device 42, which monitors the Denver LAN 30. Similarly Agent 12(e) collects events from monitor device 44, which monitors the Austin LAN 32. The manager 14 collecting the security events from the agents 12 can be located at a third site, e.g., the Los Angeles headquarters, or at either site shown in FIG. 2.

In one embodiment, the Denver LAN 30 shares an address space with the Austin LAN 32. Since IP addresses are scarce and/or expensive, many companies reuse the same address range in two or more network segments. Using network address translation ("NAT" also referred to as "natting") implemented for example in routers 34 and 46, packets can be routed off the local network segments without confusion. However, the Manager 14 may have difficulty distinguishing IP addresses contained in security event fields.

For example, agent 12(d) may collect an attack by machine 38 targeted at fax 36, while agent 12(e) may collect an attack by machine 52 targeted at machine 50. If machine 52 has the same IP address as machine 38, then the source IP of both security events representing the attacks will be the same. This may cause confusion and possible faulty correlation at the manager 14.

Various issues related to address translation are overcome in one embodiment of the present invention using zone labeling. In one embodiment, a zone describes a part of the network, such as "Denver LAN." Zones may be on a smaller scale as well, or sub-zones can be further defined, such as "Denver: Engineering." Any range of IP addresses, or any collection of non-consecutive IP addresses can be designated as a zone.

In one embodiment, zone labeling is performed by the agents 12. In one embodiment, zone labeling can be a part of the normalization process, but it may be performed at any time during event processing. In one embodiment, each security event has one zone field to be populated by a label of the zone that the monitor device and the agent 12 monitor. For example, agent 12(e) would label each event as "Austin Zone."

In another embodiment, multiple zone fields can identify various zones associated with the security event. In one embodiment, a security event includes the zones of the source of the event, the destination of the event, the monitor device that is responsible for the original event, and the agent 12 that generated the normalized event. These zones can be used to populate event fields having some descriptive name, such as "Device Zone," "Source Zone," "Destination Zone," "Agent Zone," and other similar names.

In one embodiment, the zone field contains a zone reference identifier that can be used to address into a table containing additional zone attributes, such as zone name, the zone's external identifier, and various other values or identifiers associated with the zone. In another embodiment, the zone field may contain any of these attributes directly. In yet another embodiment, each event can have several zone fields for each zone identified, such as "Agent Zone ID," "Agent Zone Name," and so on.

Such labeling is even more useful when zones are on a smaller scale than entire facility networks. For example, the attacker machine 38 may be in zone "Denver: Engineering," the target router 34 may be in zone "Denver: DMZ," the monitor device may be in zone "Denver: IT," and the agent 12(d) may be in yet another zone, or also in the "Denver: IT" zone. Various other entities and their zones may be included in other embodiments of security events.

Figure 3:
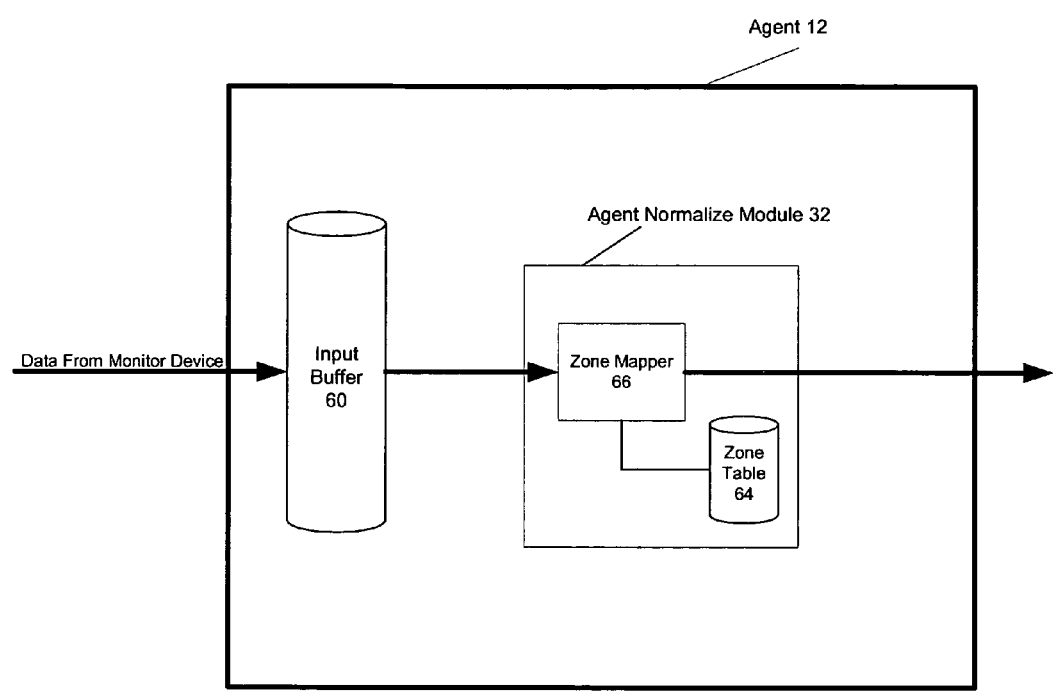
FIG. 3 is a block diagram of a software agent according to one embodiment of the present invention.

One embodiment of an agent 12 configured to perform zone identification is now described with reference to FIG. 3. In one embodiment, unprocessed security events from the monitor device (e.g. IDS) associated with the agent 12 are collected by the agent 12 in an input buffer 60. This information is then used by the agent normalize module 62, which is configured to map the data contained in the unprocessed security events to a normalized event schema. In one embodiment, the event fields included in the event schema include various zone fields. In one embodiment, these include a zone associated with an event source, a zone associated with an event destination, a zone associated with the monitor device, and a zone associated with the agent.

In one embodiment, these fields are populated by a zone mapper 66. The zone mapper accesses a zone table 64. In one embodiment, the zone table associates ranges of IP addresses with zones. An example zone table is shown in Table 1 below:

TABLE 1

| IP Address Range | Zone Name |
|---|---|
| 9.0.0.0-9.255.255.255 | Public Address Space: IBM |
| 56.0.0.0-56.255.255.255 | Public Address Space: US Postal Service |
| 191.0.0.0-192.0.1.255 | Public Address Space |
| 192.168.0.0-192.168.0.64 | Denver: Engineering |
| 192.168.0.64-192.168.0.128 | Denver: Marketing |
| 192.168.0.128-192.168.0.255 | Denver: DMZ |
| 192.168.0.255-192.168.255.255 | Private Address Space |
| 197.0.0.0-197.255.255.255 | Dark Address Space |

Table 1 above is only a simplified example. A real world zone table 64 may specify one hundred or more zones, and cover the entire range of possible IP addresses. The zone mapper 66 thus uses the zone table 64 to map certain IP addresses to zones according to the associations provided by the zone table 64. For example, if the source IP of an event is 192.168.0.55, then the zone mapper 66 would populate the "Source Zone" field with "Denver: Engineering."

In one embodiment, the zone table 64 shown in Table 1 would be resident on agent 12(d) on the Denver LAN 30. In one embodiment, the zone table 64 of agent 12(e) describes the zones of the Austin LAN 32 instead of the Denver LAN 30 in the same IP address range.

Figure 4:
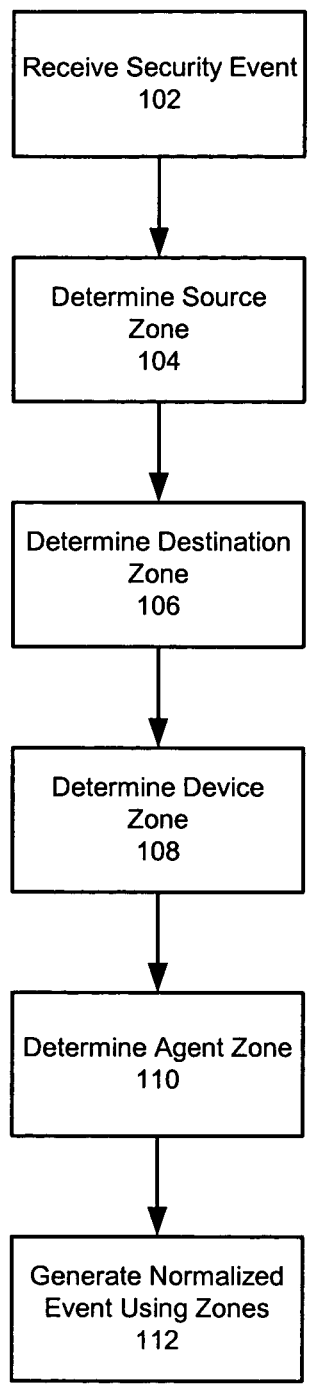
FIG. 4 is a flow diagram illustrating zone mapping according to one embodiment of the present invention.

One embodiment of zone identification is now described with reference to FIG. 4. In block 102, the agent receives the raw unprocessed security event from the monitor device, such as a firewall, router, or IDS. In block 104, the agent determines the zone to which the source of the security event belongs.

In block 106, the agent determines the zone to which the destination of the security event belongs. If the destination is not on the local network monitored by the device associated with the agent, then the zone of the destination may not be accurately determined, since the destination IP address may be translated before delivery at a remote site.

In block 108, the agent determines the zone to which the monitor device that generated the security event belongs. Since the monitor device will generally not shift zones on a regular basis, the device zone may be fixed at agent configuration. In one embodiment, the device IP address is mapped to a zone for each security event.

In block 110, the agent determines the zone to which the agent itself belongs. Since the agent will generally not shift zones on a regular basis, the agent zone may be fixed at agent configuration. In one embodiment, the agent's IP address is mapped to a zone for each security event.

In block 112, the agent generates a normalized security event. In one embodiment, this includes populating the various zone fields with the appropriate zones determined in blocks 104, 106, 108, and 110. The normalized event may undergo additional processing before being sent on to a manager.

In other embodiments, zones other than the four zones discussed above can also be determined and used to further identify the security event, such as a target and attacker zones, where there are different from source and destination. In yet other embodiments, less than four zones may be used. In one embodiment, only one of the four zones discussed above is used, e.g., the monitor device zone. Other embodiments can use any two or any three of the zones discussed above.

The manager 14 can use the zone fields of the normalized security events in any number of ways. In one embodiment, it can use it to keep track of events from various network segments with overlapping address spaces. Correlation rules can also be created that respond to the observation of certain zones, such as prohibited zones. Furthermore, by distributing the zone identification to the agents, the manager 14 is spared this computational task.

Thus, a network security system has been described. In the forgoing description, various specific values and data structures were given names, such as "security event" and "zone table," and various specific modules, such as "agents" and "agent normalize module" have been described. However, these names are merely to describe and illustrate various aspects of the present invention, and in no way limit the scope of the present invention. Furthermore, various modules, such as the manager 14, and the agents 12 in FIG. 1, can be implemented as software or hardware modules, or without dividing their functionalities into modules at all. The present invention is not limited to any modular architecture either in software or in hardware, whether described above or not.

What is claimed is:

1. A method performed by a manager of a network security system monitoring a network, the method comprising:
receiving a first normalized security event from a first distributed agent of the network security system, the first distributed agent configured to receive security events from a first network device monitoring a first portion of the network and to normalize the security events using a first zone table, the first normalized security event adhering to a universal schema used by the network security system and including a non-globally unique Internet protocol (IP) address and a first identifier of the first portion of the network, wherein the IP address and the first identifier are not identical, and wherein the first zone table associates the IP address with the first identifier; and
receiving a second normalized security event from a second distributed agent of the network security system, the second distributed agent configured to receive security events from a second network device monitoring a second portion of the network and to normalize the security events using a second zone table, the second normalized security event adhering to the universal schema used by the network security system and including the same IP address and a second identifier of the second portion of the network, wherein the same IP address and the second identifier are not identical, wherein the second zone table associates the same IP address with the second identifier, and wherein the first identifier is not identical to the second identifier;
wherein an address space of the first portion of the network includes the IP address and at least partially overlaps an address space of the second portion of the network.

2. The method of claim 1, wherein the address space of the first portion of the network comprises a set of IP addresses.

3. The method of claim 1, further comprising correlating the first normalized security event and the second normalized security event using a rules engine.

4. The method of claim 1, wherein the IP address indicates a source of the first normalized security event, and wherein the source of the first normalized security event resides in the first portion of the network.

5. The method of claim 1, wherein the IP address indicates the first agent, and wherein the first agent resides in the first portion of the network.

6. The method of claim 1, wherein the IP address indicates the first network device, and wherein the first network device resides in the first portion of the network.

7. A manager of a network security system, the manager comprising:
a tangible processor;
an agent manager configured to:
receive a first normalized security event from a first agent of the network security system, the first agent configured to receive security events from a first network device monitoring a first portion of the network and to normalize the security events using a first zone table, the first normalized security event adhering to a universal schema used by the network security system and including an Internet Protocol (IP) address and a first identifier of the first portion of the network, wherein the IP address and the first identifier are not identical, and wherein the first zone table associates the IP address with the first identifier; and
receive a second normalized security event from a second agent of the network security system, the second agent configured to receive security events from a second network device monitoring a second portion of the network and to normalize the security events using a second zone table, the second normalized security event adhering to the universal schema used by the network security system and including the same IP address and a second identifier of the second portion of the network, wherein the same IP address and the second identifier are not identical, and wherein the second zone table associates the same IP address with the second identifier, and wherein the first identifier of the first portion of the network is not identical to the second identifier of the second portion of the network; and
a rules engine configured to correlate the first normalized security event and the second normalized security event responsive to tracking portions of the network associated with the first and second normalized security events based on the first and second identifiers.

8. A method for normalizing a security event that includes an Internet Protocol (IP) address, the method comprising:
a normalization device receiving the security event from a monitored network device in a first portion of a network;
the normalization device determining a zone name associated with the IP address using a zone table, the zone table associating the IP address with the zone name, wherein the zone name and the IP address are not identical, and wherein the IP address is not globally unique and is shared by a device in a second portion of the network, and wherein the zone name indicates that the security event is associated with the first portion of the network;

the normalization device normalizing the security event by mapping information within the security event into an event schema that includes a zone field populated with the zone name; and the normalization device transmitting the normalized security event to a manager that is configured to receive the normalized security event from the normalization device and correlate the normalized security event according to a rule defining a security incident.

9. The method of claim 8, wherein the zone name describes a network segment whose address space includes the IP address.

10. The method of claim 8, wherein the IP address indicates a source of the security event.

11. The method of claim 8, wherein the IP address indicates a destination of the security event.

12. The method of claim 8, wherein the IP address indicates the monitored network device.

13. The method of claim 8, wherein the IP address indicates the normalization device.

14. The method of claim 8, wherein determining the zone name associated with the IP address comprises determining a zone associated with the IP address, wherein the zone comprises a set of IP addresses.

15. The method of claim 14, wherein determining the zone name associated with the IP address further comprises determining a sub-zone associated with the IP address, wherein the sub-zone comprises a subset of the set of IP addresses.

16. A method for correlating security events in a manager, the method comprising:

receiving a first normalized security event from a first device, the first normalized security event including an Internet Protocol (IP) address and a first zone name associated with the IP address, the first zone name representing a first portion of a network, wherein the IP address and the first zone name are not identical, the first normalized security event adhering to a universal schema that includes a zone name field, and wherein a first zone table associates the IP address with the first zone name;

receiving a second normalized security event from a second device, the second normalized security event including the same IP address and a second zone name associated with the IP address, wherein the second zone name is not identical to the same IP address, wherein the second zone name is not identical to the first zone name, the second zone name representing a second portion of the network, the second normalized security event adhering to the universal schema that includes the zone name field, and wherein a second zone table associates the IP address with the second zone name; and correlating the first normalized security event and the second normalized security event according to a rule defining a security incident.

17. The method of claim 16, wherein the IP address is non-globally unique.

18. The method of claim 16, wherein the first zone name describes a first network segment whose address space includes the IP address, and wherein the second zone name describes a second network segment whose address space includes the IP address.

19. The method of claim 16, wherein the IP address indicates a source of the first security event.

20. The method of claim 16, wherein the IP address indicates a destination of the first security event.

21. The method of claim 16, wherein the first device received a raw security event from a monitored network device, and wherein the IP address indicates the monitored network device.

22. The method of claim 16, wherein the IP address indicates the first device.

* * * * *